United States Patent [19]
Pabodie

[11] 3,977,321
[45] Aug. 31, 1976

[54] PRINTING BAND

[75] Inventor: Robert M. Pabodie, Dayton, Ohio

[73] Assignee: Monarch Marking Systems, Inc., Dayton, Ohio

[22] Filed: May 23, 1973

[21] Appl. No.: 363,214

Related U.S. Application Data

[63] Continuation of Ser. No. 176,889, Sept. 1, 1971, abandoned.

[52] U.S. Cl. ............................................. 101/111
[51] Int. Cl.² ........................................ B41J 1/20
[58] Field of Search ............... 101/111, 93 C, 93.14

[56] References Cited
UNITED STATES PATENTS

| | | | |
|---|---|---|---|
| 923,703 | 6/1909 | Prendes | 101/111 X |
| 1,058,008 | 4/1903 | Standley | 101/111 X |
| 1,558,869 | 10/1925 | Gulling et al. | 101/111 |
| 2,762,297 | 9/1956 | Baer | 101/111 X |
| 3,133,497 | 5/1964 | Martin | 101/111 X |
| 3,164,084 | 1/1965 | Paige | 101/111 X |
| 3,338,160 | 8/1967 | Heil | 101/111 X |
| 3,587,455 | 6/1971 | Childress | 101/111 X |

*Primary Examiner*—Edgar S. Burr
*Assistant Examiner*—Edward M. Coven
*Attorney, Agent, or Firm*—Joseph J. Grass

[57] ABSTRACT

There is disclosed a set of flexible, endless, printing bands. Each printing band has a plurality of elongated printing blocks, flexible hinges joining adjacent printing blocks at their base portions, a printing element on the surface of each printing block, and at least one tooth on the underside of each printing block. The printing blocks are extremely long compared to the gap between adjacent printing blocks at their outer portions, the hinge length is substantially greater than the hinge thickness, the thickness of the printing block is many times greater than the thickness of the hinge, and the length of the printing band at its outer portion is many times greater than the hinge length.

10 Claims, 6 Drawing Figures

PRINTING BAND

CROSS-REFERENCE TO RELATED APPLICATIONS

This application is a continuation of application Ser. No. 176,889, filed Sept. 1, 1971, now abandoned, owned by the assignee of the present application.

BACKGROUND OF THE INVENTION

1. Field of the Invention

This invention relates to the art of printing bands.

2. Brief Description of the Prior Art

Prior art printing bands are typically molded using elastomeric material such as rubber. Such printing bands include printing blocks joined at their base portions by flexible hinges and strands of flexible material such as nylon or fabric extend through the hinges and the base portions of the printing blocks. As disclosed for example in Canadian Pat. No. 653,495 to Frederic L. Rieger, each belt or band has lugs or teeth cooperable with notches in a pressure pad wheel. The teeth on the bands are shown in that patent to be disposed on the undersides of the hinges. It is, however, known in the art of printing bands to dispose a tooth on the underside of each printing block and to have no tooth on the underside of any of the associated hinges. It is also known to have printing blocks whose outer portions are longer than their repective base portions. Another prior art printing band is disclosed in U.S. Pat. No. 3,418,929 to Robert T. Nelson.

SUMMARY OF THE INVENTION

The invention resides in a unitary, elongated, flexible printing band having a plurality of printing blocks, and a plurality of hinges, with each hinge joining adjacent printing blocks at their base portions. The printing band can be drawn around a wheel at the printing position without any appreciable distortion of the printing element formed on the outer surface of the printing block. Although the printing band of the invention is disclosed to be of the endless type, the invention is applicable to printing bands which are not of the endless type. In the printing band of the invention, at least one tooth and preferably three teeth are integrally formed in the underside of each base portion of each printing block, there being no tooth on the underside of any hinge. The printing blocks are longer at their outer portions than at their base portions. Printing elements are formed on the outer portions of the printing blocks and extend beyond at least one end of the respective base portions. Each hinge has a ratio of hinge length to hinge thickness of at least about 4 to 1 and the ratio of the length of a printing block at its outer portion to the length of the gap between adjacent printing blocks at their outer portions is at least about 10 to 1. When using elastomeric materials with which to construct the printing band, it is preferred to reinforce the band by means of strands of flexible material extending in a lengthwise direction through the hinges and through the base portions of the printing blocks. It is also preferred to have a ratio of the thickness of a printing block to the thickness of an adjacent hinge of about 6 to 1, and to have a ratio of the length of a printing block at its outer portion to the hinge length of an adjacent hinge of about 7 to 1.

DETAILED DESCRIPTION OF THE PREFERRED EMBODIMENT

Figure 1:
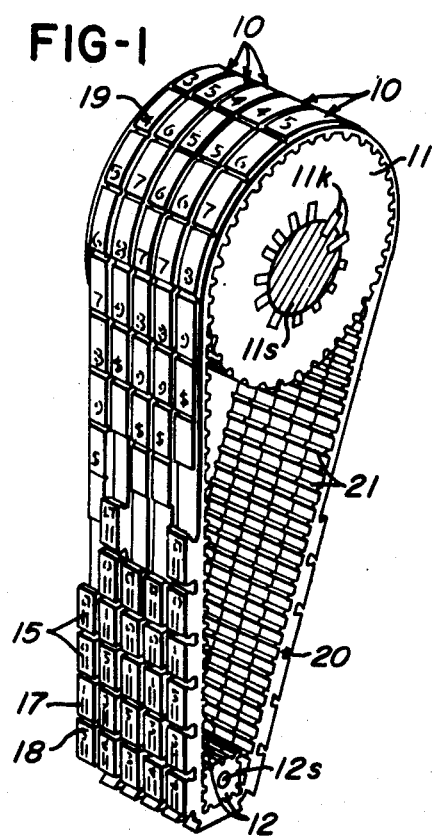
FIG. 1 is a perspective view of a set of printing bands in accordance with the invention.
Figure 2:
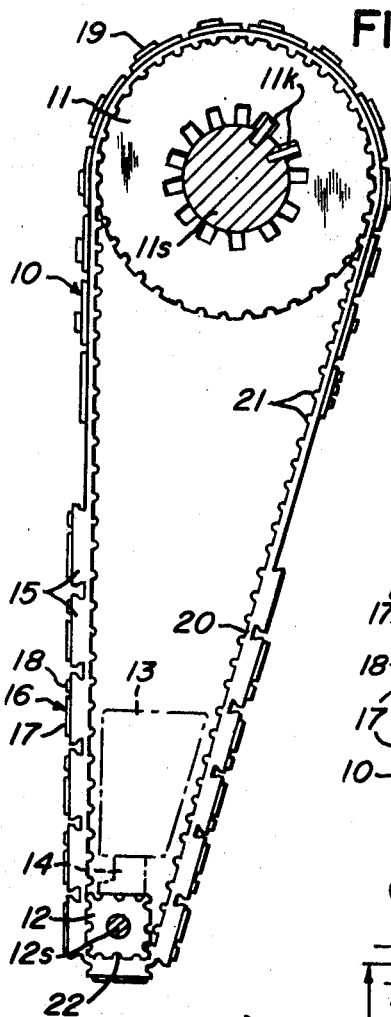
FIG. 2 is an end elevational view of the set of printing bands shown in FIG. 1.
Figure 4:
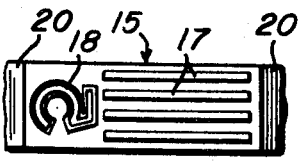
FIG. 4 is a view taken along line 4—4 of FIG. 3 showing the printing block which is disposed at the printing positions.
Figure 6:
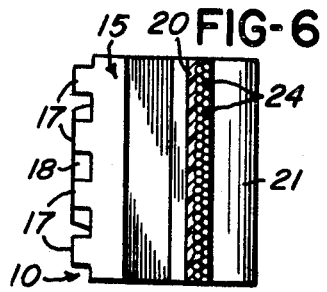
FIG. 6 is a sectional view taken along line 6—6 of FIG. 5.

Referring to FIG. 1, there is shown a set of printing bands 10. Each printing band 10 passes around a respective notched wheel 11 and a respective notched wheel 12. Each wheel 11 is rotatably mounted, as for example by the selector shaft 11s. The selector shaft 11s is shiftable so that its keys 11k are alignable with any one of the wheels 11. When the keys 11k are aligned with the selected wheel 11 the selector shaft 11s can be rotated and the respective printing band 10 is shifted, by an amount which is a function of the amount of rotation of the selector shaft 11s, until the selected printing block 15 on the band 10 is brought to the printing position. The respective wheel 12 rotates about a shaft 12s as the printing band 10 is shifted by rotation of the selector shaft 11s. Each printing band 10 is under tension. A detent mechanism 13 has individual detent members 14 engageable with the respective wheels 12. The detent member 14 holds the respective printing band 10 in a detented position but enables the respective wheel 12 to be rotated when the respective band is shifted.

Each printing band 10 is shown to include printing blocks 15 having printing elements 16 formed integrally on their outer surfaces. Each printing element 16 includes a plurality of elongated spaced apart printing members 17 and a corresponding printing member 18 integrally formed on the surface of the respective printing block 15. The printing members 17 can print machine readable code representations and the printing members 18 can print the corresponding human readable characters. Printing elements 16 of each block 15 are different so that a set of machine readable and human readable numerics, a dollar sign or the equivalent, and a decimal point can be printed.

The printing band 10 also includes a section having human readable indicia 19 as disclosed in Canadian Pat. No. 653,495. The outer surfaces of the human readable indicia 19 do not extend outwardly as far as do the outer surfaces of the printing element 16, so that in the event the wheel 11 is turned inadvertently to bring the human readable indicia 19 to the printing position, the human readable indicia cannot be inked by the inking mechanism (not shown).

Figure 3:
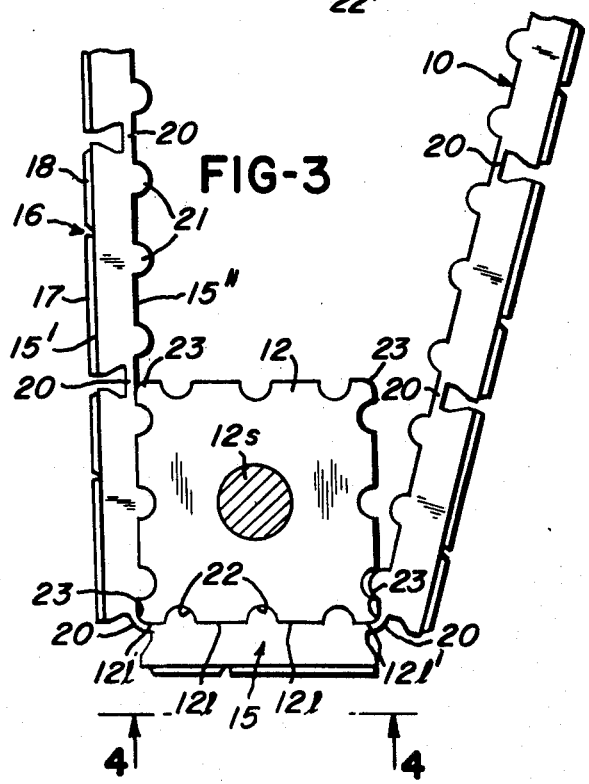
FIG. 3 is an enlarged elevational view showing a fragmentary portion of a printing band shown in FIGS. 1 and 2 and a cooperating wheel.
Figure 5:
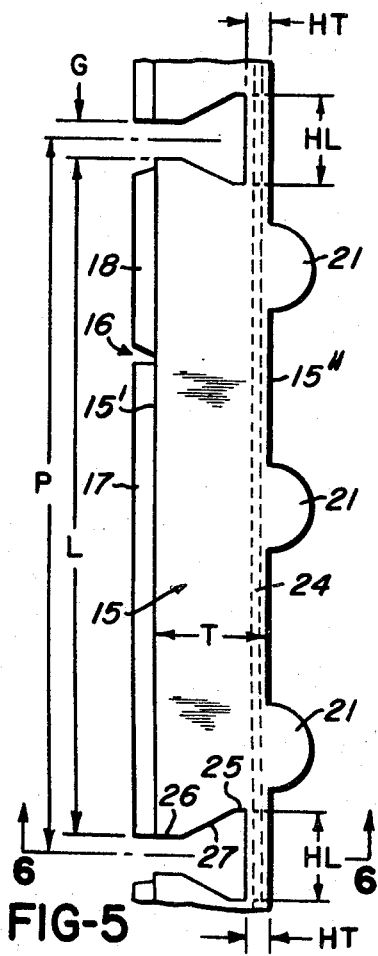
FIG. 5 is an elevational view of a fragmentary portion of the printing band shown in FIG. 3, but shown on a larger scale.

With reference to FIGS. 3 through 6 and particularly FIG. 5, hinges 20 are shown to join and connect adjacent printing blocks 15. Lugs or teeth 21 are shown to be formed integrally on the underside of each printing block 15. At least one such tooth 21 and preferably three such teeth 21 are provided. The teeth on the entire printing band 10 are equally spaced apart. One of the teeth 21 is centered between the ends of the base portion of the printing block 15 and the remaining two teeth are disposed near but are spaced from the respective ends of the base portion of the printing block and the hinges. The teeth 21, accordingly do not affect the flexibility of the hinges 20. There is no tooth on the underside of any hinge 20. The teeth 21 engage completely in notches 22 in the wheel 12, thereby insuring proper positioning of the printing band by the detented wheel 12. In addition, the teeth 21 prevent any slippage between the wheel 12 and the respective band 10. As shown in FIG. 3, the wheel 12 supports the entire printing block 15 which is at the printing position at lands 12$l$ in addition to approximately one-half of each of the associated hinges 20 at lands 12$l'$. The corners 23 of the square wheel 12 are slightly radiused to prevent damage to the hinges 20.

In accordance with the invention each hinge has a ratio of hinge length HL to hinge thickness HT of at least about 4 to 1. In addition, the ratio of the length L of a printing block at its outer portion 15' to the gap length G between adjacent printing blocks at their outer portions 15' is at least about 10 to 1.

The printing band 10 is composed of elastomeric material such as rubber and is constucted so that the hinges 20 will readily flex to obviate distortion at the printing elements 16. When using elastomeric materials, it is preferred to reinforce the printing band 10 by providing a plurality of strands 24 of flexible material which extends through the hinges 20 and through the base portions of the printing blocks 15. These strands 24 can comprise nylon thread.

It is preferred that the ratio of the length L of each printing block 15 at its outer portion 15' to the hinge length HL to about 7 to 1. It is preferred that the ratio of the thickness T of the printing block 15 to the thickness HT of the adjacent hinge 20 be about 6 to 1; the height of the printing element 16 is excluded from this ratio. It is also preferred that the ratio of the length L of the printing block 15 at its outer portion 15' to the hinge length HL be about 7 to 1. The pitch P is considered to be the distance between the midpoint of one hinge 20 and the midpoint of the adjacent hinge 20.

Each end of each printing block 15 is shown to have a vertical end surface 25 which extends to the outer surface of the hinge 20. The end of the printing block 15 also has a vertical end surface 26 which extends from the outer surface of the printing block 15. The surfaces 25 and 26 are joined by an inclined surface 27. This construction provides for a small gap length G and a relatively long hinge length HL. The space between adjacent printing blocks 15 is formed by a core in the molding machine in which the printing band 10 is molded. The illustrated shape for the ends of the printing blocks 15 enables the printing band 10 to be removed from the mold without difficulty.

By way of a specific example, not limitation, the hinge thickness HT is 0.013 inch and preferably less than about 0.020 inch. The hinge length HL is about 0.062 inch. The thickness T of the printing block 15 is about 0.078 inch, and the height of the printing element 16 is about 0.012 inch. The length L of the printing block 15 at its outer portion 15' is about 0.456 inch, the length of the printing block at its base portion 15'' is about 0.419 inch, and the gap length G is about 0.025 inch. The length of each of the four sides of the wheel 12 is approximately equal to the pitch P of the printing band 10. Accordingly, in this specific example the ratio of the hinge length HL to hinge thickness HT is 4.8 to 1, the ratio of the length L of the printing block at its outer surface to the gap length G between adjacent printing blocks 15 at their outer portions is 18.4 to 1, the ratio of the thickness T of the printing block 15 to the hinge thickness HT is 6.0 to 1, and the ratio of the length L of the printing block 15 to the hinge length HL of an adjacent hinge is 7.3 to 1. The elastomeric material of which the printing band 10 is composed has a Shore A, durometer hardness preferably between about 60 and 75.

Other embodiments and modifications of this invention will suggest themselves to those skilled in the art, and all such of these as come within the spirit of this invention are included within its scope as best defined by the appended claims.

I claim:

1. For a printer: a unitary flexible printing band including a plurality of printing blocks having respective base portions, a plurality of flexible hinges, each hinge joining adjacent printing blocks at their base portions, at least one tooth integrally formed on the underside of each base portion of each printing block, but there being no tooth on the underside of any hinge, the printing blocks being longer at their outer portions than at their base portions, printing elements formed on the outer portions of the printing blocks opposite their respective base portions and extending beyond at least one end of the respective base portions, each hinge having a ratio of hinge length to hinge thickness of at least about 4 to 1, and the ratio of the length of a printing block at its outer portion to the length of the gap between adjacent printing blocks at their outer portions being at least about 10 to 1, the teeth being sufficiently small to enable the printing band to bend through at least 45° at each hinge between adjacent printing blocks.

2. A printing band as defined in claim 1, including strands of flexible material extending in a lengthwise direction through the hinges and the base portions of the printing blocks, wherein each hinge has a thickness of about 0.013 inch.

3. A printing band as defined in claim 1, including strands of flexible material extending in a lenghthwise direction through the hinges and the base portions of the printing blocks, wherein the ratio of the length of a printing block at its outer portion to the hinge length of an adjacent hinge is about 7 to 1.

4. A printing band as defined in claim 1, including strands of flexible material extending in a lengthwise direction through the hinges and the base portions of the printing blocks, wherein the ratio of the thickness of a printing block to the thickness of an adjacent hinge is about 6 to 1.

5. A printing band as defined in claim 1, wherein the ratio of the thickness of a printing block to the thickness of an adjacent hinge is about 6 to 1, and wherein the ratio of the length of a printing block at its outer portion to the hinge length of an adjacent hinge is about 7 to 1.

6. A printing band as defined in claim 1, a wheel having a plurality of sides, each side of the wheel having at least one notch cooperable with a tooth on the printing band, the band being under tension and the base portion of one block being in contact with and supported by one side of the wheel while its tooth is in a corresponding notch in the wheel, the pitch of the printing band being equal to the distance between the midpoint of one hinge and the midpoint of an adjacent hinge, the length of each side of the wheel being approximately equal to the pitch of the printing band.

7. A printing band as defined in claim 1, and a wheel having a plurality of sides, each side of the wheel having three spaced apart notches, each printing block having three teeth cooperable with the notches in a side of the wheel, the band being under tension and the base portion of one block being in contact with and supported by one side of the wheel while the teeth are in the corresponding notches in the wheel, each side of the block being sufficiently long to support a printing block and a portion of each adjacent hinge.

8. A printing band as defined in claim 1, wherein the printing element of each printing block comprises a plurality of elongated, spaced apart, members integrally formed on the surface of the printing block and extending in a lengthwise direction for printing a machine readable code representation.

9. For a printer: a unitary flexible, endless printing band including a plurality of printing blocks having respective base portions, a plurality of flexible hinges, each hinge joining adjacent printing blocks at their base portions, three teeth integrally formed on the underside of each base portion of each printing block, but there being no tooth on the underside of any hinge, printing elements formed on the outer portions of the printing blocks opposite their respective base portions and extending beyond at least one end of the respective base portions, each hinge having a ratio of hinge length to hinge thickness of about 5 to 1, the ratio of the length of a printing block at its outer portion to the length of the gap between adjacent printing blocks at their outer portions being about 18 to 1, the ratio of the length of a printing block at its outer portion to the length of an adjacent hinge being about 7 to 1, and the ratio of the printing block thickness to the hinge thickness being about 6 to 1, the teeth being sufficiently small to enable the printing band to bend through at least 45° to each hinge between adjacent printing blocks.

10. A printing band as defined in claim 9, wherein the printing element of each printing block comprises a plurality of elongated, spaced apart, members integrally formed on the surface of the printing block and extending in a lengthwise direction for printing a machine readable code representation.

* * * * *

UNITED STATES PATENT AND TRADEMARK OFFICE
CERTIFICATE OF CORRECTION

PATENT NO. : 3,977,321

DATED : August 31, 1976

INVENTOR(S) : Robert M. Pabodie

It is certified that error appears in the above-identified patent and that said Letters Patent are hereby corrected as shown below:

Column 3, line 37, "to" (first occurrence) should be --be--.
Column 6, line 17, "to" should be --at--.

Signed and Sealed this

Thirtieth Day of November 1976

[SEAL]

Attest:

RUTH C. MASON
Attesting Officer

C. MARSHALL DANN
Commissioner of Patents and Trademarks